United States Patent [19]

Turover

[11] 4,085,233
[45] Apr. 18, 1978

[54] FOOD PRODUCT MADE FROM MUSHROOM STUMPS AND METHOD FOR MANUFACTURING THE SAME

[75] Inventor: Alan S. Turover, San Jose, Calif.

[73] Assignee: Castle & Cooke, Inc., San Jose, Calif.

[21] Appl. No.: 764,703

[22] Filed: Feb. 1, 1977

[51] Int. Cl.² ............................ A23L 1/00; A23L 1/22
[52] U.S. Cl. ................................. 426/615; 426/638; 426/640; 426/481; 426/495
[58] Field of Search ............... 426/481, 495, 615, 640, 426/638

[56] References Cited

U.S. PATENT DOCUMENTS

| 2,723,199 | 11/1955 | Todd | 426/481 |
|---|---|---|---|
| 3,231,395 | 1/1966 | Duggan et al. | 426/615 |
| 3,342,610 | 9/1967 | Molsberry | 426/615 |
| 3,857,979 | 12/1974 | Beauvais | 426/615 |
| 3,860,726 | 1/1975 | Yamane | 426/481 |

*Primary Examiner*—Jeanette M. Hunter
*Attorney, Agent, or Firm*—Owen, Wickersham & Erickson

[57] ABSTRACT

A product is made from mushroom stumps, heretofore wasted. After a preliminary dry treatment to remove dirt, the stumps are washed, and then the wet product fiber is broken down to make a puree. The puree is separated, as by centrifuging or filtering, from the remaining dirt and impurities, and the separated puree is pasteurized. Then it may be concentrated and used as a liquid concentrate or may be dried and used as a powder.

11 Claims, 5 Drawing Figures

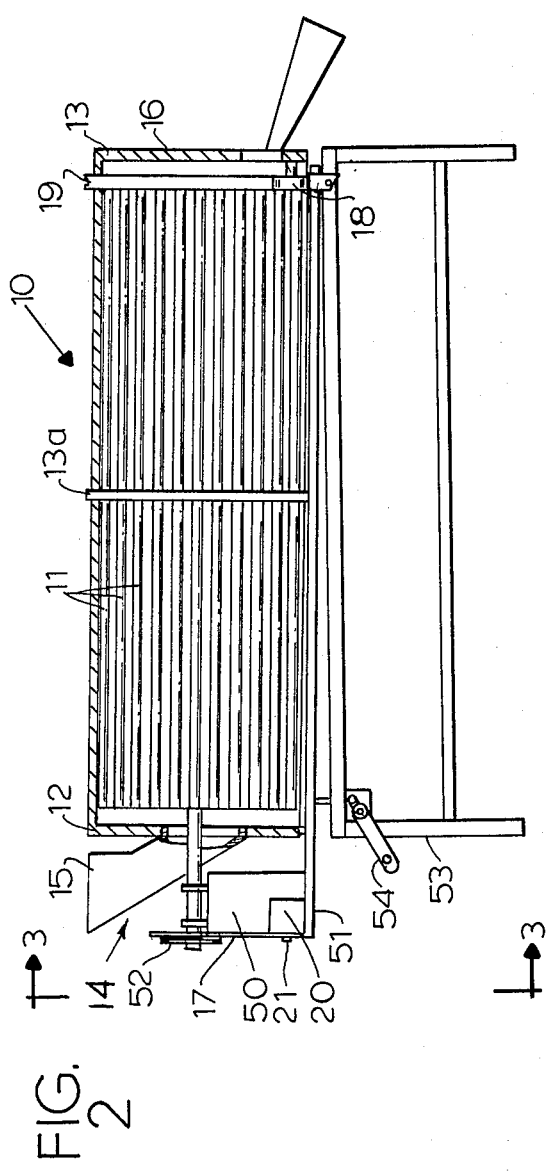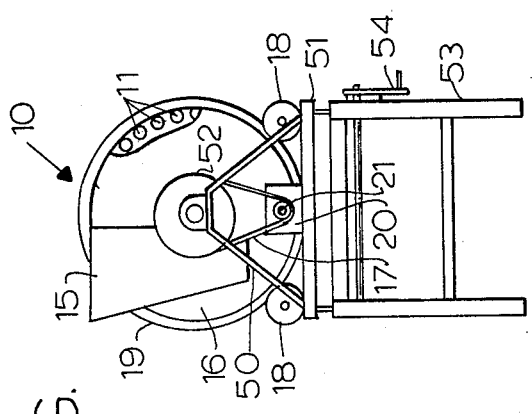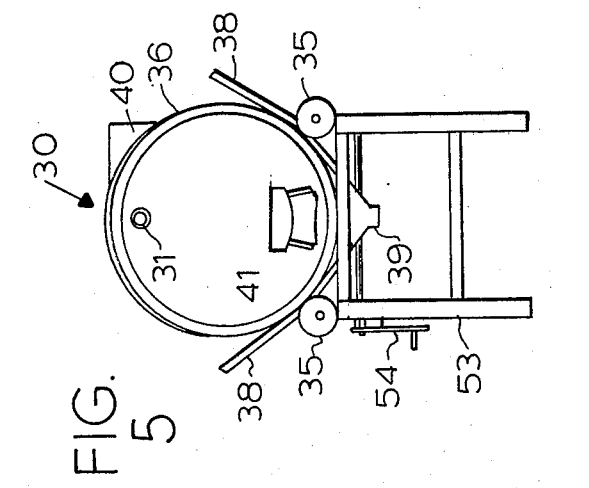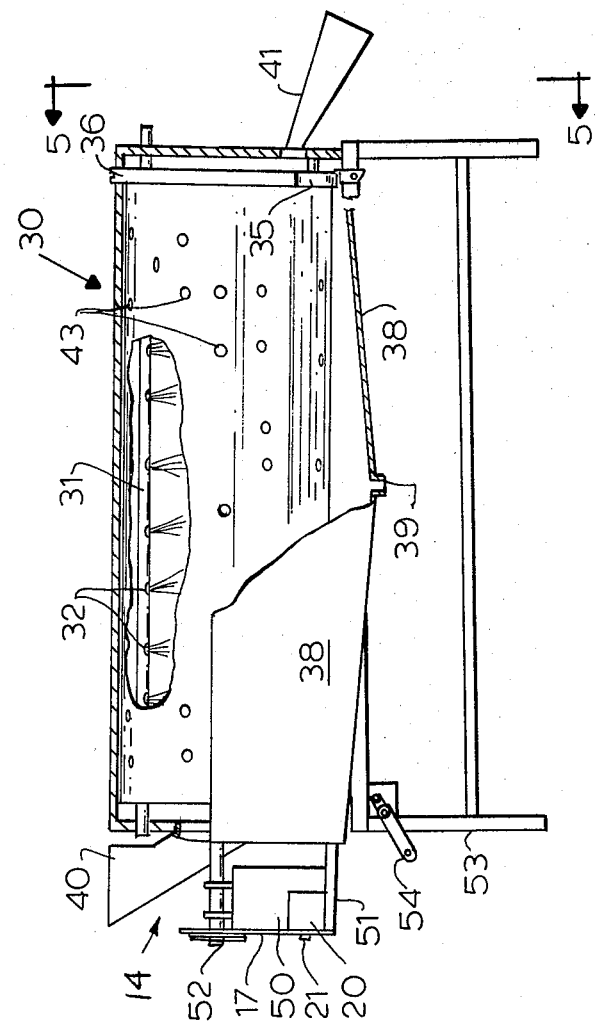

FOOD PRODUCT MADE FROM MUSHROOM STUMPS AND METHOD FOR MANUFACTURING THE SAME

BACKGROUND OF THE INVENTION

This invention relates to a food product made from the stumps of mushrooms, which have heretofore been wasted. The invention also relates to a method for making this product.

Mushrooms are typically picked by grasping the stalk, pushing down slightly, twisting and then lifting the mushroom. This releases the mushroom from the soil in the area of what are sometimes called "the root", though actually the "roots" are a network of mycelium fibers. Much compost material, often largely consisting of casing soil, in which the mushrooms are grown not only adheres to the sides of the mushrooms but is included in the inner portions of the so-called "root". In order to get rid of this soil—herein called "dirt"—and other inedible materials, the stalk is typically sliced, and, heretofore, the bottom portion which contains the compost or dirt has been discarded.

This discarded stump amounts to about 20% of the total weight of the mushroom. The stumps of one mushroom grower that have had to be discarded over 1 year's operations under the present procedures have been found to weigh about 9 million pounds. Even the destruction of the stumps is expensive, costing this grower about $50,000.00 per year.

Some years ago a research project was instituted to try to find out how to utilize this immense waste of a product that contains much valuable food, but no adequate technique for washing and utilizing the mushroom stumps was discovered.

Thus, an important object of the present invention is to utilize the heretofore-discarded mushroom stumps as the basis for a food product, high in protein, which is safely edible and can be used in many foods.

Due to great difficulties heretofore encountered in washing the stumps and due to the fact that this washing has not been able to get rid of all the compost or dirt, there seems to be no conventional way of processing the stumps to arrive at an acceptable product. However, another important object of the invention is to prepare the mushroom stumps in such a way that a food product is produced which may be used as a flavoring agent in soup bases and also may be used as part of or in a broad range of industrial and institutional food items, including bouillon cubes, ptotein-flavor potentiators, dips, gravies, and not only for human foods but also for pet foods for certain pets.

SUMMARY OF THE INVENTION

Briefly described, the invention calls for a preliminary step of getting rid of much dirt while the stumps are still dry, then washing the mushroom stumps with water to get rid of most of the loose dirt, and then breaking down the product fibers as by pulverizing, grinding and so on. This breaking-down step, in effect, physically separates the dirt from adherence to or entanglement in the fibers, although the dirt and fibers remain mixed with each other. The next step is to separate the dirt from the puree which results from the step of breaking down the wet product fibers. This may be accomplished by centrifuging, filtration, or by other suitable means.

Once the dirt has been separated out, the product is ready for pasteurization to insure that the food product will not contain dangerous bacteria. After that, the liquid material is preferably concentrated. This may conclude the procedure, and the product may be sold as a concentrated puree, or the process can go further by resorting to drying and, if desirable, even powdering the product.

BRIEF DESCRIPTION OF THE DRAWING

FIG. 2 is a view in side elevation of a rotating drum apparatus which may be used in the step of cleaning the stumps in a dry state.

FIG. 3 is a view in end elevation, partly broken away, of the drum of FIG. 2, looking toward the inlet end.

FIG. 4 is a view in side elevation of a wet-washing apparatus that may be employed in the invention.

FIG. 5 is a view in end elevation, partly broken away, of the apparatus of FIG. 4, looking toward the outlet end.

DESCRIPTION OF A PREFERRED EMBODIMENT

Figure 1:
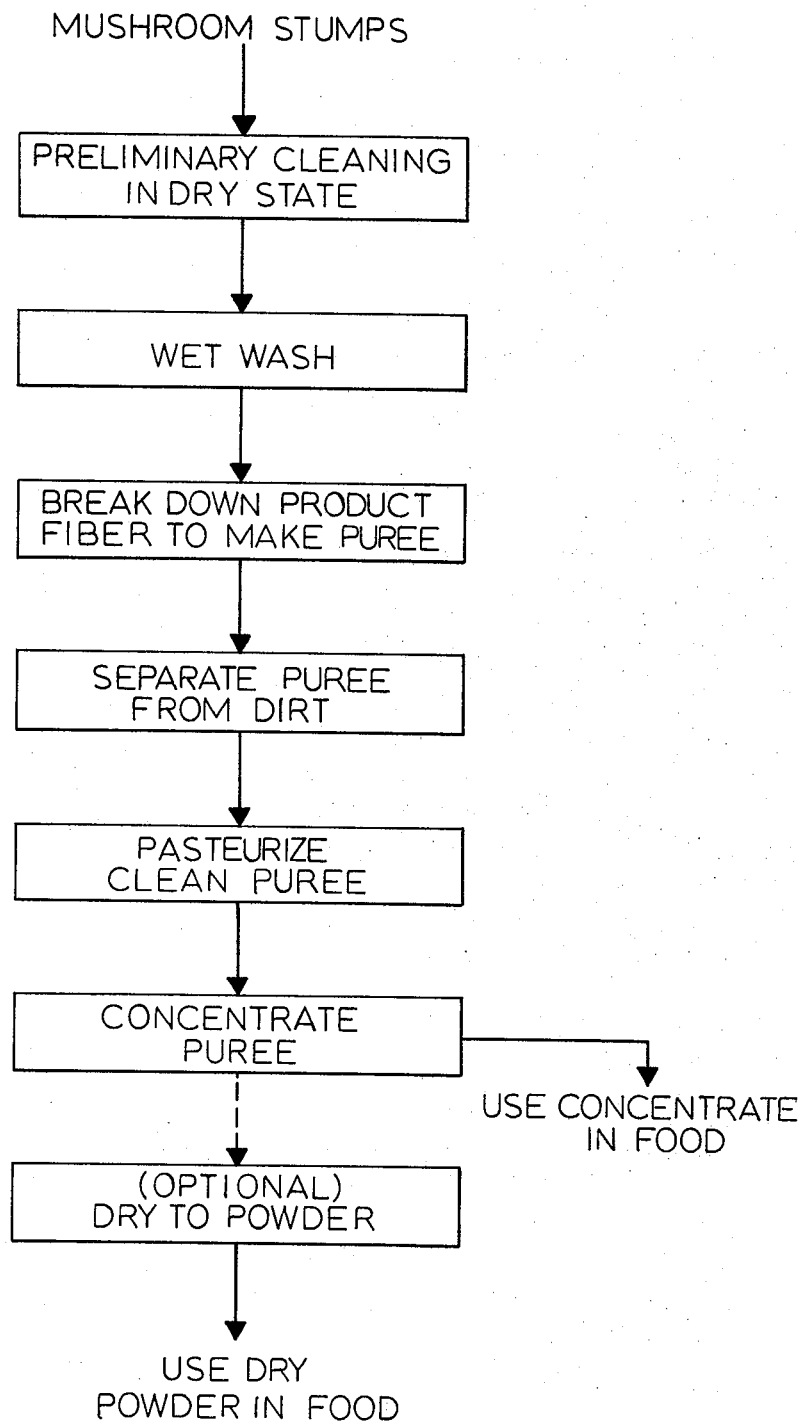
FIG. 1 is a process flow sheet illustrating the process of the invention.

After the mushrooms have been picked and the stumps severed from the mushrooms, the stumps are collected, together with undersize mushrooms and other pieces not qualifying for sale directly. They carry with them a substantial amount of compost, which, of course, makes it completely impractical to use the stumps as they are.

The first step is a preliminary cleaning in the dry state, to get rid of as much of the dirt or compost as is feasible in this dry state. For that purpose, the stumps are fed into a rotating bar reel 10 such as the reel shown in FIGS. 2 and 3. The reel or drum 10 comprises a series of lengthwise extending bars 11 secured together by rings 12, 13 and 13A, one at each end and one in the center. The reel 10 can be level or inclined upwardly or downwardly from an entrance end 14 having an inlet hopper 15 to an exit end 16. The reel 10 may be supported at its inlet end by a spider support 50 on its own frame 51, and supported and guided at its outlet end by a pair of cylindrical trunnion 18 in a trunnion guide 19. A reel shaft sprocket 52 is driven via a chain 17 by a motor 20 having a variable speed control. The drum frame 51 may be supported by a primary frame 53 and adjusted for inclination in either direction by rotation of a lever 54. The motor 20 is capable of rotating the reel 10 preferably at speeds ranging from about 5 r.p.m. up to about 50 r.p.m. As an example, the reel 10 may be about 6 feet long and about 2 feet in diameter. The bars 11, which may be steel or iron, may be circular rods about ⅜ inch in diameter and set about ⅜ inch apart—a sufficient distance to retain the stumps while letting loose dirt drop through. The stumps are in the reel 10 typically for about 3 to 11 minutes, enough time being allowed to enable freeing the stumps from much of the dirt, up to the situation when the point of diminishing return is well passed, and it is no longer worthwhile to continue the agitation and abrasion that free the stumps from loose dirt. Typically, in 100 pounds of crude stumps, this step will result in removal of about 21 pounds of dirt, leaving about 79 pounds of partially cleaned mushroom stumps, typically containing about 6 pounds of dirt. Of course, the dirt initially associated with the stumps varies widely in amount from about 23% to about 33% for example, of the total stump-dirt weight.

The next step is to wash the stumps, preferably for about 3 to about 14 minutes in a tap water spray. This may be accomplished, as shown in FIGS. 4 and 5 (FIG. 5 is a rear view) while running the stumps down through an inclined stainless steel perforated drum 30, similar in many respects to the dry bar reel 10. The drum 30 rotates in order to cause abrasion between the mushroom stumps themselves and between the stumps and the drum, while tap water from a heater 31 having nozzles 32 is sprayed down on the mushrooms inside the drum 30. The dry and wet cleaners 10 and 30 are basically the same except that the dry reel 10 has the ⅜ inch rods and the wet cleaner 30 is a perforated drum with the header, nozzles, a splash shield and collection pan 38, and a drain 39 for waste water and dirt. As with the dry reel 10, the angle of inclination of the drum 30 is adjustable by rotation of a lever 54, and is driven by a similar hydraulic motor 20 with speed-varying controls. A spider support (not shown) supports the front end of the drum 30, while trunnions 35 support the rear end via a trunnion guide 36, as in the bar reel 10. An inlet feed hopper 40 sends in mushrooms flowing from the bar reel 10, and an exit chute 41 is located at the exit end. The drum 30 may be about 6 feet long and 2 feet in diameter and may be made from 304 stainless steel panel plate with ⅜ inch diameter holes 43 staggered to be about 1¼ inches apart, center hole to center hole. The drum may be rotated at about 5 to about 50 r.p.m., the spray header 31 has overlapping high pressure from sprays about 6 inches apart, spraying at pressures, preferably greater than 50 p.s.i. and up to about 180 p.s.i. or even up to 300 p.s.i. Some detergent or other chemical cleaning or preserving agent may be used at the upper end of the drum in the sprays, but most of the sprays are tap water. The drum may be made up of bars or of sheet material with holes large enough to allow the dirt and the water to pass through but small enough to retain the stumps. Typically, the washing of 79 pounds of stumps from step 1 will result in recovery of 85 pounds of wet stumps and the discarding of about twelve pounds of wet dirt.

High pressure nozzles, abrasion baths, and other techniques may be used in the washing step, so long as the stumps are actually freed from loose dirt on the sides and also from some of the dirt held by the mycelium fibers.

This washing step accomplishes a gross type of cleaning, but the resulting material is still not clean enough for use. Therefore, the washed and wet stumps, after draining, are next broken down into small fragments by any of various processes, including grinding or pulverizing. This step results in a puree mixture which is still dirty, but the dirt and fibers are no longer entangled with each other, because the material has been so broken down. A hammer mill, a knife mill, or a colloid mill may be used for this step.

One method presently preferred for this step employs a Fitz mill (e.g., a Model D comminuting machine made by the Fitzpatrick Company). This is a type of knife mill with sixteen stainless steel knives arranged in four rows of four knives, rotating on a stainless steel shaft with a motor speed of 4700 r.p.m. and having a 0.125 inch diagonal screen. This may be followed, if desired, by putting the material through a rotary screw compressor with a 0.020 inch screen, from which a dirty cake is removed. This may be a juice extractor, such as FMC Corporation's Model No. 35.

The next step is to separate the dirt physically from the puree. One way of accomplishing this separation is by centrifuging; another is to send the puree through a filter press. It has been found that a continuous basket centrifuge (such as those made by DeLaval, e.g., Model 12 base bearing centrifuge or Mark III, operating at from 450 to 1800 G's—or 1650–3300 r.p.m.) gives excellent results. Centrifuging works because the dirt is heavier than the mushroom juice, so that the dirt tends to settle first.

A curious and unexpected fact that has been learned is that yield can be improved by freezing the material taken from the Fitz mill and then thawing it before centrifuging it. This step was found in one test to increase the yield from 38% (without freezing) to 57%.

Without freezing, the juice extractor increased the yield in some tests from 38% to 41% as a minimum and up to 49% as a maximum.

Another method of separating is filtration. Instead of using the centrifuge, a filter press may be used, such as a Willmes presser, having a perforated, rotating, stainless steel cylinder, an inner rubber sleeve, and an air compressor. Other horizontal or vertical mechanical filter presses or hydraulic basket filter presses can be used.

Yields obtained without centrifuging from a filter press have varied from 53% to 62%.

At the end of the separation stage, the product is a cleaned puree of comminuted mushroom stump material.

This cleaned puree may next be pasteurized or given some other treatment to reduce the microbiological load. If the puree is heated to a temperature over 160°, for about a minute or more, the protein may precipitate; so such temperatures and times are avoided. Typically the pasteurization may be done at 150° F for 2 minutes in a tubular pasteurizer or a plate pasteurizer or 240° F for less than 1 minute with rapid cooling to less than 140° F in a plate heat exchanger, resulting in a purified puree. A Crepaco plate heat exchanger Model S-2 may be used for the pasteurization step.

Once the puree has been pasteurized, the next step is preferably concentration. The concentration step may involve vacuum concentration using an evaporator. Such a step may concentrate the product from a puree containing roughly 5.4% soluble solids to a concentrate containing roughly 51% soluble solids. This has been accomplished by heating the product to as high as 130° F or by heating it at temperatures as low as 83° F, preferably under a vacuum of 28 to 29 inches of mercury, while drawing off the free moisture. The lower temperatures are preferred. A Majonnier Lo-Temp vacuum evaporator may be used, as may mechanically aided thin film vacuum evaporators made by Pfaudler. It is generally preferable to concentrate at as high a temperature as can be used without destroying the flavor or denaturing the protein. The higher the temperature, the more denaturing; but, also, the higher the temperature, the faster the throughput. Therefore, this step may take some care. Experimental batches have achieved concentration as high as 63.5% soluble solids. Balance is sought between operational costs and final soluble solids concentration, product viscosity, and preserving effect.

The concentrated product is suitable for use commercially, and the process may stop with the concentration step. However, for some uses it is desirable to have a dry product, and, of course, all that needs to be done to convert the concentrated product into a dry product is to dry it. The drying may be done by spray dryers, freeze dryers, drying ovens or by any other desired system.

The product is a clean mushroom-derivative product containing much of the protein and other nutrient of the mushroom in a liquid or powdered form.

The cleanliness of the product may be determined by an ash analysis. Such ash analysis has been done by an official technique approved by the Association of Official Agricultural Chemists. It calls for ashing an empty ashing dish for 30 minutes by placing it in an oven at 500° C, cooling the dish in a desiccator, weighing a sample of the material to be ashed, and then drying and carbonizing it by holding it over a Bunsen burner flame for about 10 minutes. Then the dish and the sample are placed in an oven at 550° C and kept there for 6 hours. After that, it is cooled and weighed, with the percent of ash being the weight of ash divided by the weight of the original sample multiplied by 100.

Such ash analysis shows that straight compost dirt contains about 21-25% ash, while straight completely clean mushrooms contain 0.6-1.26% ash. The initial raw material of this invention, that is the dirty mushroom stumps, has been found to contain roughly 6-9% ash, which is equivalent to roughly 27-42% dirt. After the steps of washing and breaking down the fibers, the mushrooms have been found still to contain 1½-3% ash, indicating a substantial amount (5-10%) of dirt. However, after centrifuging the ash content has been found to be as low as 0.40%, which is approximately the same as clean mushrooms, and therefore the indication is that all of the dirt has been cleaned out. The step of pasteurization simply helps to preserve the product by reducing or destroying enzyme and microbiological activity.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A process for making a useful food product from mushroom stumps comprising,
   removing loose dirt from the dry stumps,
   washing the cleaned stumps with water under pressure to remove further dirt,
   breaking down the stumps to small particle size to form a puree,
   separating the remaining dirt from the puree,
   pasteurizing the puree, and
   concentrating the pasteurized puree.

2. The process of claim 1 wherein the cleaning step includes sending the stumps through an inclined perforated drum rotating at speeds from 5 r.p.m. up to about 50 r.p.m., while dirt drops out through the drum.

3. The process of claim 1 wherein the washing step includes sending the cleaned stumps through a rotating inclined perforated drum while spraying water at about 60-180 p.s.i. thereon, and draining the washed stumps.

4. The process of claim 1 wherein the breaking-down step includes sending the washed stumps through a comminuter.

5. The process of claim 4 which further includes freezing and then thawing the puree after it has been comminuted.

6. The process of claim 4 which further includes sending the puree through a rotary compressor after it has been comminuted.

7. The process of claim 1 wherein said removing step comprises centrifuging.

8. The process of claim 1 wherein said removing step comprises filtering the puree.

9. The process of claim 1 which includes the further step of drying the concentrated puree into powder form.

10. A concentrated mushroom puree made according to the process of claim 1.

11. A concentrated mushroom puree powder made according to the process of claim 9.

* * * * *